(12) United States Patent
Zhang et al.

(10) Patent No.: US 10,002,003 B2
(45) Date of Patent: Jun. 19, 2018

(54) METHOD FOR PRESENTING INITIALIZATION PROGRESS OF HARDWARE IN SERVER, AND SERVER

(71) Applicant: Huawei Technologies Co., Ltd., Shenzhen (CN)

(72) Inventors: Fei Zhang, Hangzhou (CN); Jianfeng Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/618,595

(22) Filed: Jun. 9, 2017

(65) Prior Publication Data

US 2017/0277547 A1     Sep. 28, 2017

Related U.S. Application Data

(63) Continuation of application No. PCT/CN2015/093587, filed on Nov. 2, 2015.

(30) Foreign Application Priority Data

Dec. 11, 2014   (CN) .......................... 2014 1 0765291

(51) Int. Cl.
*G06F 8/00*       (2018.01)
*G06F 9/44*       (2018.01)
(Continued)

(52) U.S. Cl.
CPC ........ *G06F 9/4411* (2013.01); *G06F 13/4022* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 7,493,226 B2 *   2/2009   Robertson ........ G01R 31/31727
                                                          324/537
7,568,091 B2 *   7/2009   Wu ........................... G06F 8/61
                                                          710/104
(Continued)

FOREIGN PATENT DOCUMENTS

CN     101126952 A     2/2008
CN     101192168 A     6/2008
(Continued)

OTHER PUBLICATIONS

Machine Translation and Abstract of Chinese Publication No. 101192168A, Jun. 4, 2008, 6 pages.
(Continued)

*Primary Examiner* — Cheng-Yuan Tseng
(74) *Attorney, Agent, or Firm* — Conley Rose, P.C.

(57) ABSTRACT

A method for presenting initialization progress of hardware in a server, and a server where, before a basic input/output system (BIOS) runs to a preset process, an out-of-band central processing unit (CPU) in a hardware system in which a baseboard management controller (BMC) runs establishes a connection to a graphics card using a signal selection switch, the BIOS sends presentation information for representing initialization progress of hardware included in a server to the BMC, and then, the BMC presents the presentation information using the graphics card. Therefore, the presentation information can be always presented in an entire process in which the BIOS initializes the hardware in the server.

20 Claims, 2 Drawing Sheets

(51) Int. Cl.
*G06F 13/42* (2006.01)
*G06F 13/40* (2006.01)

(56) References Cited

U.S. PATENT DOCUMENTS

| | | | | |
|---|---|---|---|---|
| 7,930,425 | B2* | 4/2011 | Bailey | H04L 41/00 |
| | | | | 709/224 |
| 8,381,034 | B2* | 2/2013 | Chen | G06F 11/2284 |
| | | | | 713/1 |
| 8,762,782 | B2* | 6/2014 | Yin | G06F 11/1417 |
| | | | | 714/36 |
| 8,943,302 | B2* | 1/2015 | Ayanam | G06F 8/665 |
| | | | | 713/1 |
| 9,542,195 | B1* | 1/2017 | Astarabadi | G06F 9/4411 |
| 2004/0073637 | A1 | 4/2004 | Larson et al. | |
| 2007/0234123 | A1 | 10/2007 | Shih et al. | |
| 2008/0046706 | A1* | 2/2008 | Hirai | G06F 11/2294 |
| | | | | 713/1 |
| 2008/0046707 | A1 | 2/2008 | Hirai et al. | |
| 2009/0319637 | A1* | 12/2009 | Wang | G06F 9/4403 |
| | | | | 709/219 |
| 2012/0011402 | A1 | 1/2012 | Chen et al. | |
| 2012/0023320 | A1 | 1/2012 | Chen et al. | |
| 2012/0110379 | A1 | 5/2012 | Shao et al. | |
| 2013/0262700 | A1* | 10/2013 | Tamura | H04L 61/25 |
| | | | | 709/245 |
| 2014/0129821 | A1 | 5/2014 | Tian et al. | |
| 2014/0143477 | A1 | 5/2014 | Lin et al. | |

FOREIGN PATENT DOCUMENTS

| | | |
|---|---|---|
| CN | 102388371 A | 3/2012 |
| CN | 103810063 A | 5/2014 |
| CN | 104503783 A | 4/2015 |
| EP | 2017765 A2 | 1/2009 |
| EP | 2472402 A1 | 7/2012 |
| WO | 2008016424 A1 | 2/2008 |

OTHER PUBLICATIONS

Machine Translation and Abstract of Chinese Publication No. 102388371A, Mar. 21, 2012, 24 pages.
Machine Translation and Abstract of Chinese Publication No. 104503783A, Apr. 8, 2015, 11 pages.
Foreign Communication From a Counterpart Application, Chinese Application No. 201410765291.3, Chinese Office Action dated Mar. 30, 2017, 8 pages.
Foreign Communication From a Counterpart Application, International Application No. PCT/CN2015/093587, English Translation of International Search Report dated Jan. 12, 2016, 2 pages.
Foreign Communication From a Counterpart Application, International Application No. PCT/CN2015/093587, English Translation of Written Opinion dated Jan. 12, 2016, 8 pages.
Foreign Communication From a Counterpart Application, European Application No. 15867772.4, Extended European Search Report dated Nov. 13, 2017, 14 pages.

* cited by examiner

METHOD FOR PRESENTING INITIALIZATION PROGRESS OF HARDWARE IN SERVER, AND SERVER

CROSS-REFERENCE TO RELATED APPLICATIONS

This application is a continuation of International Patent Application No. PCT/CN2015/093587 filed on Nov. 2, 2015, which claims priority to Chinese Patent Application No. 201410765291.3 filed on Dec. 11, 2014. The disclosures of the aforementioned applications are hereby incorporated by reference in their entireties.

TECHNICAL FIELD

The present disclosure relates to the field of computer technologies, and in particular, to a method for presenting initialization progress of hardware in a server, and a server.

BACKGROUND

Currently, during a process of starting a server, a basic input/output system (BIOS) module controls a graphics card to output a signal to a display to start the display, only when an operating system (OS) is about to start up. Before this, the display is always in a black screen state. Therefore, after the server is powered on and before the display is started, a user has to wait for a long time to visually obtain presentation information from the display.

With an increase in a quantity of central processing units (CPUs) in the server, a time from a moment when the server is powered on to a moment when the display is started becomes longer. For example, when the server includes eight CPUs and a memory that has 192 dual in-line memory modules (DIMM), the time from the moment when the server is powered on to the moment when the display is started is about 25 to 30 minutes. During a process from the moment when the server is powered on to the moment when the display is started, there is not any valid startup information on the display, and the time may be up to 30 minutes. During the period, the user can only passively wait for a long time for the display to start. If the server encounters a startup exception, a server administrator cannot be notified in a timely manner. The server administrator can obtain startup exception information only using a baseboard management controller (BMC) management interface, or checks whether the server encounters an exception by means of checking for a startup timeout, and then re-starts the server. As such, currently, there is a disadvantage that initialization progress of hardware in the server cannot be presented.

To overcome the disadvantage that the initialization progress of the hardware in the server cannot be presented, currently, a method for presenting the initialization progress of the hardware in the server is proposed. In this solution, after the server is powered on, the BIOS module controls the graphics card to output a signal to the display in order to start the display in advance, instead of starting the display when the OS is about to start up. Therefore, presentation information of a running process of the BIOS module is presented on the display.

In the foregoing solution, the BIOS module specifies a memory address in an initial running phase to start the display in advance by means of directly writing data to the memory address. However, before a Peripheral Component Interconnect Express (PCIE) expansion card is initialized, writing startup data of the BIOS module to the memory address needs to be stopped. Otherwise, an address conflict is caused, and as a result, initialization of the PCIE expansion card fails, and implementation of the BIOS module is suspended. Therefore, in the foregoing solution, although the display can be started in advance, not an entire running phase of the BIOS module is covered. That is, the display cannot always present the initialization progress of the hardware in the server in the entire running phase of the BIOS module. Therefore, there is a disadvantage that the display cannot always present related information of the initialization progress of the hardware in the server in the entire running phase of the BIOS module.

SUMMARY

Embodiments of the present disclosure provide a method for presenting initialization progress of hardware in a server, and a server in order to overcome a disadvantage that related information of initialization progress of hardware in a server cannot be always presented in an entire running phase of a BIOS module.

According to a first aspect, a server is provided, including a graphics card, and further including a BIOS module, an out-of-band system, and a signal selection switch, where the out-of-band system includes a BMC module and a hardware system in which the BMC module runs, where the signal selection switch is configured to receive a first control instruction, connect, according to the first control instruction, the graphics card and an out-of-band CPU in the hardware system in which the BMC module runs, receive a second control instruction, and switch, according to the second control instruction, the graphics card from being connected to the out-of-band CPU to being connected to a CPU or a platform controller hub (PCH) of the server. The out-of-band system is configured to send the first control instruction to the signal selection switch before receiving a switch switching instruction that is sent by the BIOS module when the BIOS module runs to a preset process, such that the out-of-band CPU is connected to the graphics card, receive presentation information that is used for representing initialization progress of hardware included in the server and that is sent by the BIOS module, and present the presentation information using the graphics card, and send the second control instruction to the signal selection switch when receiving the switch switching instruction that is sent by the BIOS module when the BIOS module runs to the preset process, and the BIOS module is configured to send the presentation information to the BMC module before running to the preset process, such that the BMC module presents the presentation information using the graphics card, and send the switch switching instruction to the BMC module when running to the preset process, such that the BMC module sends the second control instruction to the signal selection switch.

With reference to the first aspect, in a first possible implementation manner, the preset process refers to a process of performing an initialization operation on PCIE expansion card.

According to a second aspect, a method for presenting initialization progress of hardware in a server is provided, where a server to which the method is applied includes a graphics card, a BIOS module, an out-of-band system, and a signal selection switch, and the out-of-band system includes a BMC module and a hardware system in which the BMC module runs, where the method includes receiving, by the BMC module after an out-of-band CPU in the hardware system in which the BMC module runs establishes a connection to the graphics card using the signal selection switch, presentation information that is sent by the BIOS module before the BIOS module runs to a preset process, and presenting the presentation information using the graphics card.

With reference to the second aspect, in a first possible implementation manner, before the out-of-band CPU is connected to the graphics card, the BMC module further includes sending, by the BMC module, a first control instruction to the signal selection switch, such that the signal selection switch connects the out-of-band CPU and the graphics card.

With reference to the second aspect or the first possible implementation manner of the second aspect, in a second possible implementation manner, receiving, by the BMC module, presentation information sent by the BIOS module further includes receiving, by the BMC module, the presentation information sent by the BIOS module using an Intelligent Platform Management Interface (IPMI) protocol.

With reference to the second aspect or the first to the second possible implementation manners of the second aspect, in a third possible implementation manner, after presenting, by the BMC module, the presentation information using the graphics card, the method further includes receiving, by the BMC module, a switch switching instruction that is sent by the BIOS module when the BIOS module runs to the preset process, and sending, by the BMC module according to the switch switching instruction, a second control instruction to the signal selection switch, such that the signal selection switch switches the graphics card from being connected to the out-of-band CPU to being connected to a CPU or a PCH of the server.

With reference to the second aspect or the first to the third possible implementation manners of the second aspect, in a fourth possible implementation manner, the presentation information includes initialization progress information of initialization performed by the BIOS module for the hardware in the server, and information about a time difference between an end time point predicted by the BIOS module for the initialization of the hardware in the server and a current time point.

With reference to the second aspect or the first to the fourth possible implementation manners of the second aspect, in a fifth possible implementation manner, the preset process refers to a process of performing an initialization operation on PCIE expansion card.

According to a third aspect, a method for presenting initialization progress of hardware in a server is provided, where a server to which the method is applied includes a graphics card, a BIOS module, an out-of-band system, and a signal selection switch, and the out-of-band system includes a BMC module and a hardware system in which the BMC module runs, where the method includes sending, by the BIOS module before running to a preset process, presentation information that is used for representing initialization progress of the hardware included in the server to the BMC module, such that the BMC module presents the presentation information using the graphics card, and presenting, by the BIOS module after running to the preset process, the presentation information using the graphics card.

With reference to the third aspect, in a first possible implementation manner, sending, by the BIOS module, presentation information to the BMC module further includes sending, by the BIOS module, the presentation information to the BMC module using an IPMI protocol.

With reference to the third aspect or the first possible implementation manner of the third aspect, in a second possible implementation manner, after sending, by the BIOS module, presentation information to the BMC module, the method further includes sending, by the BIOS module, a switch switching instruction to the BMC module when running to the preset process, such that the BMC module sends, according to the switch switching instruction, a second control instruction to the signal selection switch in order to control the signal selection switch to switch the graphics card from being connected to an out-of-band CPU in the hardware system in which the BMC module runs to being connected to a CPU or a PCH of the server.

With reference to the third aspect or the first to the second possible implementation manners of the third aspect, in a third possible implementation manner, the presentation information includes initialization progress information of initialization performed by the BIOS module for the hardware in the server, and information about a time difference between an end time point predicted by the BIOS module for the initialization of the hardware in the server and a current time point.

With reference to the third aspect or the first to the third possible implementation manners of the third aspect, in a fourth possible implementation manner, the preset process refers to a process of performing an initialization operation on PCIE expansion card.

Related information of initialization progress of hardware in a server cannot be always presented in an entire running phase of a BIOS module. A server provided in the embodiments of the present disclosure includes a graphics card, and further includes a BIOS module, an out-of-band system, and a signal selection switch. The out-of-band system includes a BMC module and a hardware system in which the BMC module runs. The signal selection switch is configured to receive a first control instruction, connect, according to the first control instruction, the graphics card and an out-of-band CPU in the hardware system in which the BMC module runs, receive a second control instruction, and switch, according to the second control instruction, the graphics card from being connected to the out-of-band CPU to being connected to a CPU or a PCH of the server. The out-of-band system is configured to send the first control instruction to the signal selection switch before receiving a switch switching instruction that is sent by the BIOS module when the BIOS module runs to a preset process, such that the out-of-band CPU is connected to the graphics card, receive presentation information that is used for representing initialization progress of the hardware included in the server and that is sent by the BIOS module, and present the presentation information using the graphics card, and send the second control instruction to the signal selection switch when receiving the switch switching instruction that is sent by the BIOS module when the BIOS module runs to the preset process. The BIOS module is configured to send the presentation information to the BMC module before running to the preset process, such that the BMC module presents the presentation information using the graphics card, and send the switch switching instruction to the BMC module when running to the preset process, such that the BMC module sends the second control instruction to the signal selection switch. As such, in the embodiments of the present disclosure, the presentation information can be always presented in an entire process in which the BIOS module initializes the hardware in the server. This overcomes an existing disadvantage that related information of the initialization progress of the hardware in the server cannot be always presented in the entire running phase of the BIOS module.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases. Only A exists, both A and B exist, and only B exists. In addition, the character "/" in this specification generally indicates an "or" relationship between the associated objects.

In the following, implementation manners of the present disclosure are described in detail with reference to the accompanying drawings. It should be understood that the embodiments described herein are merely used to illustrate and explain the present disclosure, but are not intended to limit the present disclosure. In addition, the embodiments of the present application and features in the embodiments may be mutually combined in a case in which they do not conflict with each other.

In the following, the implementation manners of the present disclosure are described in detail with reference to the accompanying drawings.

Embodiment 1

Figure 1:
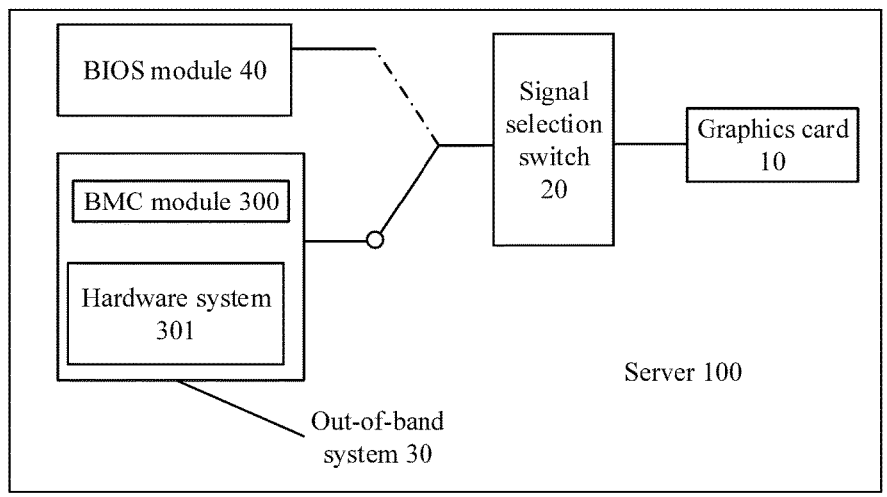
FIG. 1 is a schematic structural diagram of a server according to an embodiment of the present disclosure.

Referring to FIG. 1, this embodiment of the present disclosure provides a server 100. The server 100 includes a graphics card 10, a signal selection switch 20, an out-of-band system 30, and a BIOS module 40. The out-of-band system 30 includes a BMC module 300 and a hardware system 301 in which the BMC module 300 runs.

The signal selection switch 20 receives a first control instruction, connects, according to the first control instruction, the graphics card 10 and an out-of-band CPU (not shown) in the hardware system 301 in which the BMC module 300 runs, receives a second control instruction, and switches, according to the second control instruction, the graphics card 10 from being connected to the out-of-band CPU to being connected to a CPU or a PCH of the server 100.

The out-of-band system 30 is configured to send the first control instruction to the signal selection switch 20 before receiving a switch switching instruction that is sent by the BIOS module 40 when the BIOS module 40 runs to a preset process such that the out-of-band CPU is connected to the graphics card 10, receive presentation information that is used for representing initialization progress of hardware included in the server 100 and that is sent by the BIOS module 40, and present the presentation information using the graphics card 10, and send the second control instruction to the signal selection switch 20 when receiving the switch switching instruction that is sent by the BIOS module 40 when the BIOS module 40 runs to the preset process.

The BIOS module 40 is configured to send the presentation information to the BMC module 300 before running to the preset process such that the BMC module 300 presents the presentation information using the graphics card 10, and send the switch switching instruction to the BMC module 300 when running to the preset process such that the BMC module 300 sends the second control instruction to the signal selection switch 20.

In this embodiment of the present disclosure, optionally, the preset process refers to a process of performing an initialization operation on a PCIE expansion card.

In an architecture of a server 100 shown in FIG. 1, before a BIOS module 40 runs to a preset process, a signal selection switch 20 connects a graphics card 10 and an out-of-band CPU in a hardware system 301 in which a BMC module 300 runs, and a CPU or a PCH of the server 100 is disconnected from the graphics card 10. In this case, the BIOS module 40 sends presentation information of a running process to the BMC module 300, and then, the BMC module 300 presents the presentation information using the graphics card 10. After the BIOS module 40 runs to the preset process, the signal selection switch 20 connects the graphics card 10 and the CPU or the PCH of the server 100. In this case, the out-of-band CPU is disconnected from the graphics card 10, and the BIOS module 40 directly presents the presentation information using the graphics card 10. As such, the presentation information can be always presented in the entire running process of the BIOS module 40, instead of being presented only in a part of the running process. Therefore, an existing problem in the background is resolved.

In this embodiment of the present disclosure, after the server 100 is powered on, the hardware system 301 in which the BMC module 300 runs needs to be first initialized. Initialization of the hardware system 301 in which the BMC module 300 runs is a well-known technology, and is not described in detail herein.

Figure 2:
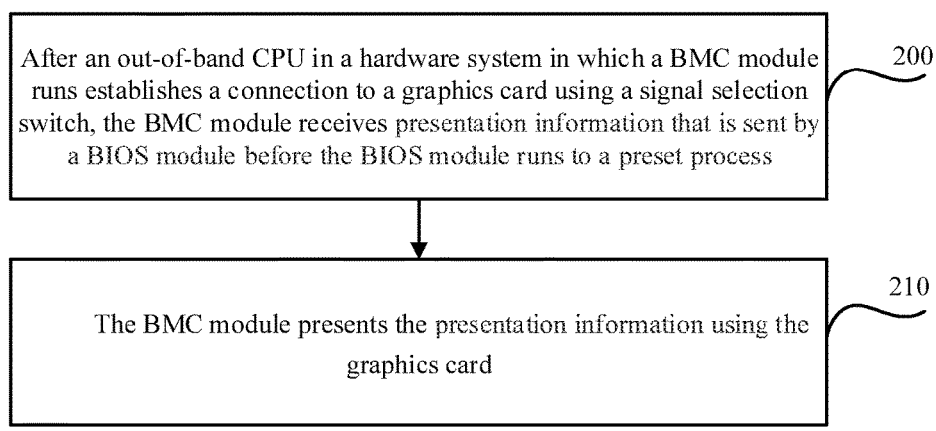
FIG. 2 is a flowchart of presenting initialization progress of hardware in a server according to an embodiment of the present disclosure.

In an embodiment of the present disclosure, a method for presenting initialization progress of hardware in a server is further provided. As shown in FIG. 2, a server to which the method is applied includes a graphics card, a signal selection switch, an out-of-band system, and a BIOS module. The out-of-band system includes a BMC module and a hardware system in which the BMC module runs. An implementation process is as follows.

Embodiment 2

Step 200: After an out-of-band CPU in the hardware system in which the BMC module runs establishes a connection to the graphics card using the signal selection switch, the BMC module receives presentation information that is sent by the BIOS module before the BIOS module runs to a preset process.

Step 210: The BMC module presents the presentation information using the graphics card.

In this embodiment of the present disclosure, before the out-of-band CPU of the BMC module is connected to the graphics card, the following operation is further included.

The BMC module sends a first control instruction to the signal selection switch, such that the signal selection switch connects the out-of-band CPU and the graphics card.

That is, the BMC module enables, using the first control instruction, the signal selection switch to connect the out-of-band CPU and the graphics card.

In this embodiment of the present disclosure, there are multiple manners in which the BMC module receives the presentation information sent by the BIOS module. Optionally, the following manner may be used.

The BMC module receives the presentation information sent by the BIOS module using an IPMI protocol.

Certainly, there may be another manner in which the BMC module receives the presentation information sent by the BIOS module, and this is not described in detail herein.

In this embodiment of the present disclosure, after the BMC module presents the presentation information using the graphics card, the following operations are further included.

The BMC module receives a switch switching instruction that is sent by the BIOS module when the BIOS module runs to the preset process, and the BMC module sends, according to the switch switching instruction, a second control instruction to the signal selection switch, such that the signal selection switch switches the graphics card from being connected to the out-of-band CPU to being connected to a CPU or a PCH of the server.

That is, when running to the preset process, the BIOS module instructs the signal selection switch to disconnect the graphics card from the out-of-band CPU and connect the CPU or the PCH of the server and the graphics card. In this case, the BIOS module can directly present the presentation information using the graphics card.

In this embodiment of the present disclosure, the presentation information may include multiple types of content. For example, the presentation information includes initialization progress information of initialization performed by the BIOS module for hardware in the server, and information about a time difference between an end time point predicted by the BIOS module for the initialization of the hardware in the server and a current time point.

In this embodiment of the present disclosure, initialization of the hardware in the server includes the following operations. Quick Path Interconnect (QPI) initialization, memory initialization, and initialization of a PCIE expansion card.

Accordingly, the presentation information may be information about the QPI being initialized, or information about the memory being initialized, or information about the PCIE expansion card being initialized.

In this embodiment of the present disclosure, optionally, the preset process refers to a process of performing an initialization operation on the PCIE expansion card.

After the server is powered on and before initialization of the PCIE expansion card is completed, a user has to wait for a long time to visually obtain presentation information. The presentation information can be displayed only after the BIOS module initializes the PCIE expansion card. In this case, presenting the presentation information does not cause an address conflict, and further does not lead to an initialization failure of the PCIE expansion card. Therefore, in this embodiment of the present disclosure in order to avoid causing an address conflict and further resulting in an initialization failure of the PCIE expansion card, the preset process refers to the process of performing the initialization operation on the PCIE expansion card.

In the solution provided in Embodiment 2, before a BIOS module runs to a preset process, an out-of-band CPU in a hardware system in which a BMC module runs establishes a connection to a graphics card using a signal selection switch, the BIOS module sends presentation information that is used for representing initialization progress of hardware included in a server to the BMC module. Then, the BMC module presents the presentation information using the graphics card. After the BIOS module runs to the preset process, a CPU or a PCH of the server establishes a connection to the graphics card using the signal selection switch, and the BIOS module directly presents the presentation information using the graphics card. Therefore, in this embodiment of the present disclosure, the presentation information can be always presented in an entire process in which the BIOS module initializes the hardware in the server. This overcomes an existing disadvantage that related information of the initialization progress of the hardware in the server cannot be always presented in the entire running phase of the BIOS module.

Figure 3:
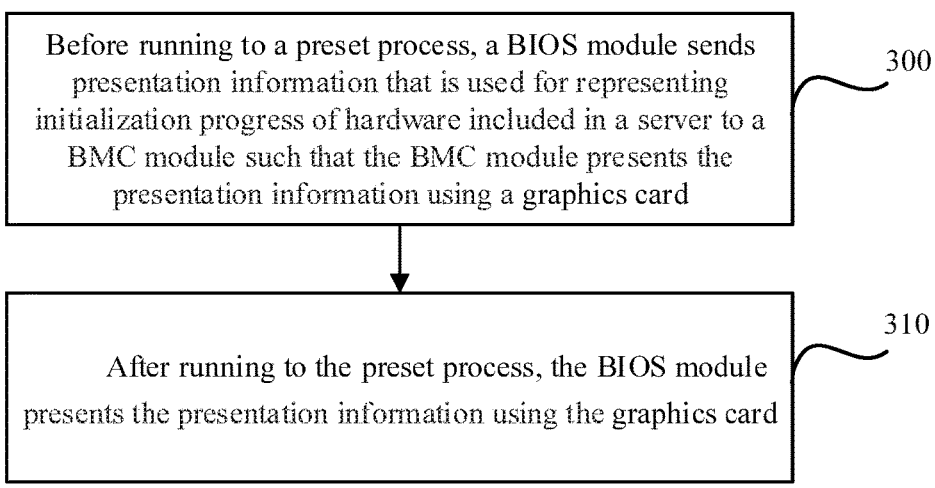
FIG. 3 is another flowchart of presenting initialization progress of hardware in a server according to an embodiment of the present disclosure.

In an embodiment of the present disclosure, another method for presenting initialization progress of hardware in a server is further provided, as shown in FIG. 3. A server to which the method is applied includes a graphics card, a signal selection switch, an out-of-band system, and a BIOS module. The out-of-band system includes a BMC module and a hardware system in which the BMC module runs. An implementation process is as follows.

Embodiment 3

Step 300: Before running to a preset process, the BIOS module sends presentation information that is used for representing initialization progress of hardware included in the server to the BMC module such that the BMC module presents the presentation information using the graphics card.

Step 310: After running to the preset process, the BIOS module presents the presentation information using the graphics card.

In this embodiment of the present disclosure, there are multiple manners in which the BIOS module sends the presentation information to the BMC module. Optionally, the following manner may be used.

The BIOS module sends the presentation information to the BMC module using the IPMI protocol.

Certainly, another manner may also be used, and is not described in detail herein.

Further, in this embodiment of the present disclosure, after the BIOS module sends the presentation information to the BMC module, the following operation is further included.

The BIOS module sends a switch switching instruction to the BMC module when running to the preset process such that the BMC module sends, according to the switch switching instruction, a second control instruction to the signal selection switch in order to control the signal selection switch to switch the graphics card from being connected to an out-of-band CPU in the hardware system in which the BMC module runs to being connected to a CPU or a PCH of the server.

In this embodiment of the present disclosure, optionally, the presentation information includes initialization progress information of initialization performed by the BIOS module for the hardware in the server, and information about a time difference between an end time point predicted by the BIOS module for the initialization of the hardware in the server and a current time point.

In this embodiment of the present disclosure, the preset process refers to a process of performing an initialization operation on a PCIE expansion card.

In the solution provided in Embodiment 3, before a BIOS module runs to a preset process, a hardware system in which a BMC module runs establishes a connection to a graphics card using a signal selection switch, the BIOS module sends presentation information that is used for representing initialization progress of hardware included in a server to the BMC module, and then, the BMC module presents the presentation information using the graphics card. After the BIOS module runs to the preset process, a CPU or a PCH of the server establishes a connection to the graphics card using the signal selection switch, and the BIOS module directly presents the presentation information using the graphics card. Therefore, in this embodiment of the present disclosure, the presentation information can be always presented in an entire process in which the BIOS module initializes the hardware in the server. This overcomes an existing disadvantage that related information of the initialization progress of the hardware in the server cannot be always presented in the entire running phase of the BIOS module.

Persons skilled in the art should understand that the embodiments of the present disclosure may be provided as a method, an apparatus (device), or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the apparatus (device), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, such that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a manner, such that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:
1. A server, comprising:
a graphics card;
a signal selection switch coupled to the graphics card;
an out-of-band system coupled to the signal selection switch and the graphics card; and
a basic input/output system (BIOS) coupled to the signal selection switch and the graphics card,
wherein the out-of-band system comprises a baseboard management controller (BMC) and a hardware system in which the BMC runs,
wherein the signal selection switch is configured to:
  receive a first control instruction;
  connect, according to the first control instruction, the graphics card and an out-of-band central processing unit (CPU) in the hardware system in which the BMC runs;
  receive a second control instruction; and
  switch, according to the second control instruction, the graphics card from being connected to the out-of-band CPU to being connected to a CPU or a platform controller hub (PCH) of the server,
wherein before receiving a switch switching instruction from the BIOS when the BIOS runs to a preset process, the out-of-band system is configured to:
  send the first control instruction to the signal selection switch such that the out-of-band CPU is connected to the graphics card;
  receive presentation information for representing initialization progress of hardware comprised in the server from the BIOS;
  present the presentation information using the graphics card; and
  send the second control instruction to the signal selection switch when receiving the switch switching instruction from the BIOS when the BIOS runs to the preset process, and
wherein the BIOS is configured to:
  send the presentation information to the BMC before running to the preset process such that the BMC presents the presentation information using the graphics card; and
  send the switch switching instruction to the BMC when running to the preset process such that the BMC sends the second control instruction to the signal selection switch.

2. The server according to claim 1, wherein the preset process refers to a process of performing an initialization operation on peripheral component interconnect express (PCIE) expansion card.

3. The server according to claim 1, wherein the BMC is further configured to:
receive the presentation information for representing the initialization progress of the hardware comprised in the server from the BIOS; and
present the presentation information using the graphics card.

4. A method for presenting initialization progress of hardware in a server, wherein the server to which the method is applied comprises a graphics card, a signal selection switch, an out-of-band system, and a basic input/output system (BIOS), wherein the out-of-band system comprises a baseboard management controller (BMC) and a hardware system in which the BMC runs, and wherein the method comprises:
receiving, by the BMC after an out-of-band central processing unit (CPU) in the hardware system in which the BMC runs establishes a connection to the graphics card using the signal selection switch, presentation information from the BIOS before the BIOS runs to a preset process; and
presenting the presentation information using the graphics card.

5. The method according to claim 4, wherein before the out-of-band CPU is connected to the graphics card, the method further comprises sending, by the BMC, a first control instruction to the signal selection switch such that the signal selection switch connects the out-of-band CPU and the graphics card.

6. The method according to claim 4, wherein receiving the presentation information from the BIOS further comprises receiving, by the BMC, the presentation information from the BIOS using an Intelligent Platform Management Interface (IPMI) protocol.

7. The method according to claim 4, wherein after presenting the presentation information using the graphics card, the method further comprises:
receiving, by the BMC, a switch switching instruction from the BIOS when the BIOS runs to the preset process; and
sending, by the BMC according to the switch switching instruction, a second control instruction to the signal selection switch such that the signal selection switch switches the graphics card from being connected to the out-of-band CPU to being connected to a CPU of the server.

8. The method according to claim 4, wherein after presenting the presentation information using the graphics card, the method further comprises:
receiving, by the BMC, a switch switching instruction from the BIOS when the BIOS runs to the preset process; and
sending, by the BMC according to the switch switching instruction, a second control instruction to the signal selection switch such that the signal selection switch switches the graphics card from being connected to the out-of-band CPU to being connected to a platform controller hub (PCH) of the server.

9. The method according to claim 4, wherein the presentation information comprises initialization progress information of initialization performed by the BIOS for the hardware in the server, and information about a time difference between an end time point predicted by the BIOS for the initialization of the hardware in the server and a current time point.

10. The method according to claim 7, wherein the presentation information comprises initialization progress information of initialization performed by the BIOS for the hardware in the server, and information about a time difference between an end time point predicted by the BIOS for the initialization of the hardware in the server and a current time point.

11. The method according to claim 4, wherein the preset process refers to a process of performing an initialization operation on peripheral component interconnect express (PCIE) expansion card.

12. The method according to claim 7, wherein the preset process refers to a process of performing an initialization operation on peripheral component interconnect express (PCIE) expansion card.

13. The method according to claim 9, wherein the preset process refers to a process of performing an initialization operation on peripheral component interconnect express (PCIE) expansion card.

14. A method for presenting initialization progress of hardware in a server, wherein the server to which the method is applied comprises a graphics card, a signal selection switch, an out-of-band system, and a basic input/output system (BIOS), wherein the out-of-band system comprises a baseboard management controller (BMC) and a hardware system in which the BMC runs, and wherein the method comprises:
sending, by the BIOS before running to a preset process, presentation information for representing initialization progress of the hardware comprised in the server to the BMC such that the BMC presents the presentation information using the graphics card; and
sending, by the BIOS after running to the preset process, a switch switching instruction such that the signal selection switch switches the graphics card from being connected to an out-of-band central processing unit (CPU) in the hardware system in which the BMC runs to being connected to a CPU or a platform controller hub (PCH) of the server.

15. The method according to claim 14, wherein sending the presentation information to the BMC comprises sending, by the BIOS, the presentation information to the BMC using an Intelligent Platform Management Interface (IPMI) protocol.

16. The method according to claim 14, wherein after sending the presentation information to the BMC, the method further comprises sending, by the BIOS, the switch switching instruction to the BMC when running to the preset process such that the BMC sends, according to the switch switching instruction, a second control instruction to the signal selection switch in order to control the signal selection switch to switch the graphics card from being connected to the out-of-band CPU in the hardware system in which the BMC runs to being connected to a CPU or the PCH of the server.

17. The method according to claim 14, wherein the presentation information comprises initialization progress information of initialization performed by the BIOS for the hardware in the server, and information about a time difference between an end time point predicted by the BIOS for the initialization of the hardware in the server and a current time point.

18. The method according to claim 15, wherein the presentation information comprises initialization progress information of initialization performed by the BIOS for the hardware in the server, and information about a time difference between an end time point predicted by the BIOS for the initialization of the hardware in the server and a current time point.

19. The method according to claim 14, wherein the preset process refers to a process of performing an initialization operation on peripheral component interconnect express (PCIE) expansion card.

20. The method according to claim 18, wherein the preset process refers to a process of performing an initialization operation on peripheral component interconnect express (PCIE) expansion card.

* * * * *

UNITED STATES PATENT AND TRADEMARK OFFICE
CERTIFICATE OF CORRECTION

PATENT NO. : 10,002,003 B2
APPLICATION NO. : 15/618595
DATED : June 19, 2018
INVENTOR(S) : Fei Zhang and Jianfeng Yang Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this
Eighteenth Day of June, 2019

Andrei Iancu
*Director of the United States Patent and Trademark Office*